(12) United States Patent
Zheng

(10) Patent No.: US 11,523,056 B2
(45) Date of Patent: Dec. 6, 2022

(54) PANORAMIC PHOTOGRAPHING METHOD AND DEVICE, CAMERA AND MOBILE TERMINAL

(71) Applicant: ZTE Corporation, Shenzhen (CN)

(72) Inventor: Liang Zheng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/418,536

(22) PCT Filed: Aug. 20, 2019

(86) PCT No.: PCT/CN2019/101489
§ 371 (c)(1),
(2) Date: Jun. 25, 2021

(87) PCT Pub. No.: WO2020/134123
PCT Pub. Date: Jul. 2, 2020

(65) Prior Publication Data
US 2022/0124247 A1 Apr. 21, 2022

(30) Foreign Application Priority Data
Dec. 28, 2018 (CN) .......................... 201811629211.6

(51) Int. Cl.
*H04N 5/232* (2006.01)
(52) U.S. Cl.
CPC ..... *H04N 5/23238* (2013.01); *H04N 5/23229* (2013.01); *G06T 2207/20172* (2013.01);
(Continued)

(58) Field of Classification Search
CPC . G06T 2207/20172; G06T 2207/20212; G06T 2207/20221; G06T 5/00;
(Continued)

(56) References Cited

U.S. PATENT DOCUMENTS

| 2011/0199372 | A1* | 8/2011 | Porter | G06T 7/254 |
| | | | | 382/106 |
| 2012/0133639 | A1 | 5/2012 | Kopf | |
| 2018/0302614 | A1* | 10/2018 | Toksvig | G06K 9/6269 |

FOREIGN PATENT DOCUMENTS

| CN | 101593350 A | 12/2009 |
| CN | 103035005 A | 4/2013 |

(Continued)

OTHER PUBLICATIONS

International Search Report for corresponding application PCT/CN2019/101489 filed Aug. 20, 2019; dated Nov. 19, 2019.

*Primary Examiner* — Farzana Hossain
(74) *Attorney, Agent, or Firm* — Cantor Colburn LLP

(57) ABSTRACT

Provided are a panoramic photographing method and device, a camera and a mobile terminal, the method includes: when panoramic photographing is performed, firstly, a ranging device acquires the depth information of the object to be photographed, that is, the distance between the object to be photographed and the photographing device, and then the offset corresponding to the current distance is acquired according to a preset mapping relationship, and the original imaging of the object to be photographed is subsequently shifted in the panoramic image to form a corrected panoramic image.

17 Claims, 4 Drawing Sheets

(52) U.S. Cl.
CPC ............... *G06T 2207/20212* (2013.01); *G06T 2207/20221* (2013.01)

(58) Field of Classification Search
CPC . G06T 7/00; G06T 7/80; H04N 5/217; H04N 5/23229; H04N 5/23238; H04N 5/262; H04N 5/3572
See application file for complete search history.

(56) References Cited

FOREIGN PATENT DOCUMENTS

| | | |
|---|---|---|
| CN | 105243637 A | 1/2016 |
| CN | 105262958 A | 1/2016 |
| CN | 106651755 A | 5/2017 |

\* cited by examiner

PANORAMIC PHOTOGRAPHING METHOD AND DEVICE, CAMERA AND MOBILE TERMINAL

CROSS-REFERENCE TO RELATED APPLICATION

The present disclosure claims priority to Chinese Patent Priority No. 201811629211.6, filed to the China National Intellectual Property Administration on Dec. 28, 2018, the disclosure of which is hereby incorporated by reference in its entirety.

TECHNICAL FIELD

The present disclosure relates to, but not limited to, the field of photography, and in particular, to a panoramic photographing method and device, a camera and a mobile terminal.

BACKGROUND

In the related technology, the human eyes can observe a scene of a large viewing angle, and the current terminal camera has a relatively small viewing angle due to the lens specification, so that one imaging of the camera cannot capture a viewing angle conforming to human eyes. Panorama is for solving this problem, and is generally centered by the photographer, and the handheld photographing device rotates the photographing, and finally spliced into a panoramic photograph through a plurality of angles. In this way, the problem that a camera with a small viewing angle takes a large viewing angle landscape or other pictures is solved. However, currently no methods have been provided to solve the problem of deformation caused by splicing panoramic photographs.

In the related technology, attentions are mainly focused on the control method for panoramic exposure in panoramic photographing, and it is ensured that the exposure of an image to be spliced is consistent, or the side is focused on two or more cameras to ensure that the image can be reasonably spliced. However, there is a problem, because the visual angle of the panoramic is very large, on the one hand is affected by the lens distortion, and on the other hand, the splicing point of the image is more on the edge, so that the images formed on the plane may have different degrees of distortion and distortion, and affect the user experience, and no effective solution is provided for this problem in the related art.

For the problem in the related art that an object in a panorama captured image is distorted, there is no effective solution at present.

SUMMARY

Embodiments of the present disclosure provide a panoramic photographing method and device, a camera, and a mobile terminal, so as to at least solve a problem in the related art that an object in a panoramic photographing image is distorted greatly.

According to an embodiment of the present disclosure, a panoramic photographing method is provided, which includes: acquiring depth information of a photographed object in panoramic photographing; acquiring, according to a pre-set mapping relationship between a depth and an offset, an offset corresponding to the photographed object in the panoramic image; correcting the panoramic image of the photographed object according to the offset.

According to another embodiment of the present disclosure, a panoramic photographing device is provided, which includes: a first acquisition module, configured to acquire depth information of a photographed object in panoramic photographing; a second acquisition module, configured to acquire, according to a preset mapping relationship between depths and offsets, an offset corresponding to the photographed object in the panoramic image; a first correction module, configured to correct the panoramic image of the photographed object according to the offset.

According to another embodiment of the present disclosure, provided is a camera, which includes: a ranging device, configured to acquire depth information of a photographed object in panoramic photographing; a processor, configured to acquire, according to a pre-set mapping relationship between a depth and an offset, an offset corresponding to the photographed object in the panoramic image; and correct the panoramic image of the photographed object according to the offset.

According to another embodiment of the present disclosure, also provided is a mobile terminal, which includes: a ranging device, configured to acquire depth information of a photographed object in panoramic photographing; a processor, configured to acquire, according to a pre-set mapping relationship between a depth and an offset, an offset corresponding to the photographed object in the panoramic image; and correct the panoramic image of the photographed object according to the offset.

According to another embodiment of the present disclosure, also provided is storage medium. The storage medium stores a computer program, wherein the computer program is configured to execute the steps in any one of the method embodiments during running.

According to another embodiment of the present disclosure, also provided is an electronic device, which includes a memory and a processor, wherein the memory stores a computer program, and the processor is configured to run the computer program so as to execute the steps in any one of the method embodiments.

According to the foregoing embodiments of the present disclosure, in the process of panoramic photographing, depth information of a photographed object, that is, a distance between the photographed object and a photographing device, is acquired by using a ranging device; then, an offset corresponding to a current distance is acquired by querying a preset mapping relationship; and subsequently, original imaging of the photographed object is correspondingly offset in a panoramic image, so as to form a corrected panoramic image. By means of the solution, the problem in the related art that an object in a panoramic photographing image is distorted greatly is solved, the distortion of the object in the panoramic image is precisely and efficiently corrected, and the aesthetic feeling of panoramic imaging is guaranteed.

BRIEF DESCRIPTION OF THE DRAWINGS

Drawings, provided for further understanding of the present disclosure and forming a part of the present disclosure, are used to explain the present disclosure together with embodiments of the present disclosure rather than to limit the present disclosure. In the drawings.

DETAILED DESCRIPTION OF THE EMBODIMENTS

The present disclosure will be described below with reference to the drawings and embodiments in detail. It is important to note that the embodiments of the present disclosure and the characteristics in the embodiments can be combined under the condition of no conflicts.

It should be noted that the terms "first" and "second" in the specification, claims, and accompanying drawings of the present disclosure are used to distinguish similar objects, and are not necessarily used to describe a specific sequence or order.

Embodiments in the present disclosure may be applied to a panoramic photographing scene, and may be applied to a mobile phone, a tablet computer, and a camera supporting panoramic photographing in the related art.

Embodiment One

Figure 1:
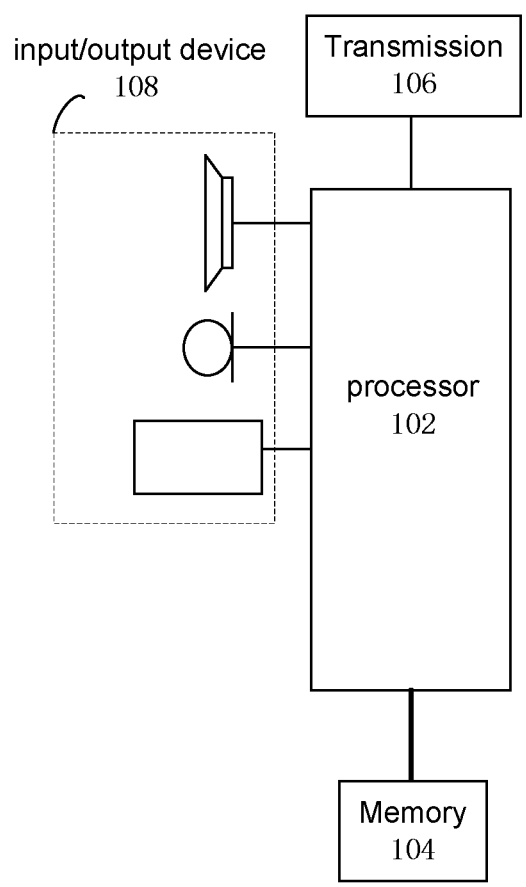
FIG. 1 is a structural block diagram of hardware of a mobile terminal of a panoramic photographing method according to an embodiment of the present disclosure.

The embodiment provided in the present disclosure may be implemented in a mobile terminal, a computer terminal, or a similar computing device. Taking the running on the mobile terminal as an example, FIG. 1 is a hardware structural block diagram of a mobile terminal of a panoramic photographing method according to an embodiment of the present disclosure. As shown in FIG. 1, the mobile terminal may include one or more (only one shown in FIG. 1) processors 102 (the processor 102 may include, but is not limited to, a microprocessor MCU or a processing device, such as a programmable logic device FPGA) and a memory 104 arranged to store data, and in an embodiment, the mobile terminal may further include a transmission device 106 and an input/output device 108 arranged as communication functions. A person of ordinary skill in the art may understand that the structure shown in FIG. 1 is merely exemplary, which does not limit the structure of the foregoing mobile terminal. For example, the mobile terminal may further include more or less components than shown in FIG. 1, or have a different configuration from that shown in FIG. 1.

The memory 104 may be configured to store software programs and modules of application software, such as program instructions/modules corresponding to the panoramic photographing method in the embodiments of the present disclosure. The processor 102 runs the software programs and modules stored in the memory 104, so as to execute various function applications and data processing, that is, to implement the foregoing method. Memory 104 may include high-speed random access memory, and may also include non-volatile memory, such as one or more magnetic storage devices, flash memory, or other non-volatile solid-state memory. In some instances, memory 104 may further include memory remotely located with respect to processor 102, which may be connected to mobile terminals over a network. Examples of such networks include, but are not limited to, the Internet, intranets, local area networks, mobile communication networks, and combinations thereof.

The transmission device 106 is arranged to receive or transmit data via one network. Specific examples of the described network may include a wireless network provided by a communication provider of the mobile terminal. In one example, the transmission device 106 may comprise a Network Interface Controller (NIC) that may be coupled to other network devices via a base station to communicate with the Internet. In one example, the transmission device 106 can be a Radio Frequency (RF) module configured to communicate wirelessly with the Internet.

Figure 2:
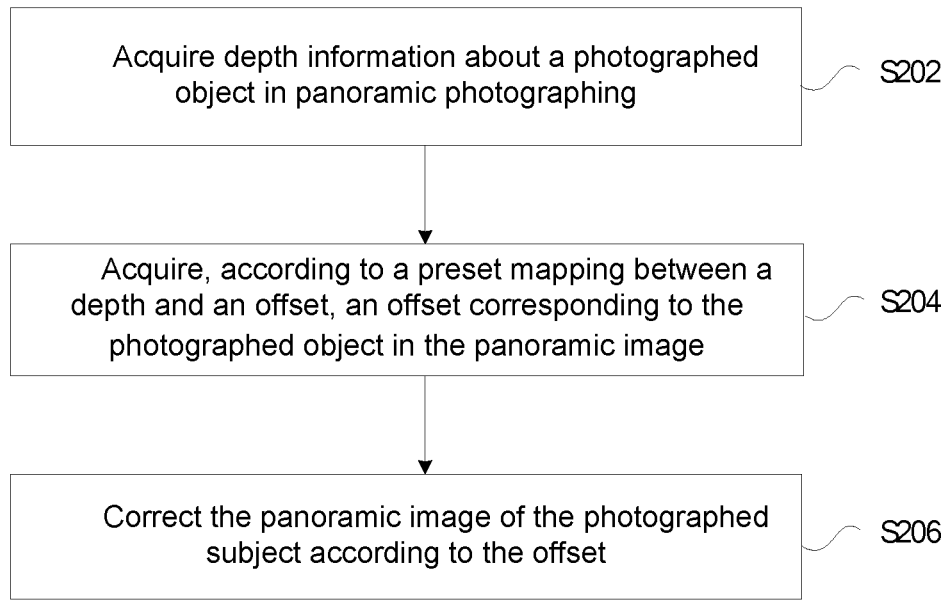
FIG. 2 is a flowchart of a panoramic photographing method according to an embodiment of the present disclosure.

A panoramic photographing method running on the mobile terminal is provided in this embodiment. FIG. 2 is a flowchart of a panoramic photographing method according to an embodiment of the present disclosure. As shown in FIG. 2, the method includes the following steps:

S202, acquiring depth information about a photographed object in panoramic photographing;

The depth information herein is a term in the photographing field, and may be understood as a distance between the current object to be photographed and the imaging plane. Step S202 may be executed by a mobile terminal having a ranging function, or may be executed by a third-party device attached to the mobile terminal, and both of them belong to the scope of protection of the present disclosure.

S204, acquiring, according to a preset mapping relationship between depths and offsets, an offset corresponding to the photographed object in the panoramic image;

The offset also refers to a correction amount of distortion, and an offset of a corresponding point after the correction.

The mapping relationship may be pre-stored in a form of a table, and a corresponding offset may be obtained by directly querying the table subsequently. The following effects are achieved in the form of a table. If a complex function relationship is obtained through fitting, when the calculation amount is large or the real-time performance of calculation time is poor, a corresponding table is prepared by using a fitting result, an input distance is used to search for a correction amount table, and in this way, during correction, correction in the form of table look-up and interpolation is used to improve time efficiency.

S206, correct the panoramic image of the photographed object according to the offset.

The shift may be an original imaging position of the object to be photographed in the panoramic image, and the shift is performed according to the shift amount, or specifically, the shift is performed on a pixel point for imaging the object to be photographed.

In an actual correction process, an important subject can be corrected, for example, a portrait, and a secondary subject is not corrected, for example, a relatively far sky, which can save a lot of computation power.

By means of the described steps, when panoramic photographing is performed, firstly, depth information about a photographed object, i.e. a distance between the photographed object and a photographing device, is acquired by means of a distance measurement device; then, an offset corresponding to a current distance is acquired by querying a pre-set mapping relationship; and subsequently, original imaging of the photographed object is correspondingly offset in a panoramic image, so as to form a corrected panoramic image. By means of the solution, the problem in the related art that an object in a panoramic photographing image is distorted greatly is solved, the distortion of the object in the panoramic image is precisely and efficiently corrected, and the aesthetic feeling of panoramic imaging is guaranteed.

In an embodiment, the correlation between the depth and the correction amount is "object-image" data obtained by firstly using a correction chart card of distance information, and a corresponding function relationship or table information is obtained by using a calculation method described in another embodiment of the present disclosure subsequently, and is used as information about the pre-set depth and the correction amount. Then, the preset information is used to obtain the distance information of the object by using the ranging function of the terminal when the terminal takes a photo, and obtain the correction amount according to the obtained preset information.

In an embodiment, before acquiring, according to a pre-set mapping relationship between a depth and an offset, an offset corresponding to the object to be photographed in the panoramic image, the mapping relationship is established in the following manner: performing panoramic photographing on a known scene, and determining, according to a position relationship between different objects in the known scene, ideal positions of the objects of different depths in a photographed picture; determining an offset of each object according to a difference between an ideal position and an actual position of each object in a photographed picture; establishing the mapping relationship according to the offset of each of the objects and the depth information of each of the objects. By means of the solution, different known scenes are photographed multiple times, for example, a regular picture card, so as to acquire a corresponding relationship between different depth information and offset, so that the established mapping relationship comprises a corresponding relationship of more entries as far as possible. The offset of each object may be more specifically understood as an offset of each pixel point of the image area of the object.

In an embodiment, determining, according to a position relationship between different objects in the known scene, ideal positions of objects with different depths in a photographed picture comprises: acquiring a distance proportion between different objects in the known scene; acquiring an ideal position of each object in a photographed picture according to the distance proportion. A distance proportion between different objects in a known scene is mapped to a photographed picture, and the distance proportion between different objects in the photographed picture should be consistent with a known scene. By means of this method, an ideal position of each object is determined, and then a comparison is performed with an original imaging position of each object, so as to obtain an offset of each object.

In an embodiment, before correcting the panoramic image of the photographed object according to the offset, acquiring a distortion correction parameter of lens of a camera compact module; correcting the panoramic image according to the distortion correction parameter. The camera is a camera for currently photographing a panoramic image, and may be integrated into a mobile terminal such as a mobile phone, and may be an independent camera. By using the solution, before the process in FIG. 2 is executed, distortion of lens of the camera compact module may be corrected firstly, so as to restore an ideal position of a photographed object more accurately.

In an embodiment, the correcting the panoramic image of the photographed object according to the offset comprises: acquiring an original imaging position of the photographed object in the panoramic image; moving the original imaging position according to the offset.

In an embodiment, after the panoramic image of the photographed subject is corrected according to the offset, acquiring a corrected image as a first image, and detecting a region to be interpolated in the first image according to a pre-set rule; performing interpolation processing on the to-be-interpolated zone according to pixels in a preset range around the to-be-interpolated zone. By means of the solution, image data is processed, and interpolation processing is performed on a place where an imaging point needs to be interpolated. The algorithm uses a correlation relationship between pixels around a pixel point to be processed to calculate a value of the pixel point to be processed, thereby solving the problem of insufficient processing details and smoothness of a conventional interpolation algorithm.

In an embodiment, detecting a region to be interpolated in the first image according to a pre-set rule comprises at least one of the following: detecting a splicing position between frame data in the first image, and taking the splicing position as the region to be interpolated; detecting pixel points in the first image whose offsets have been shifted are greater than a threshold, and using the pixel points as the region to be interpolated. By using this solution, smoothness processing can be performed by focusing on a position where image deformation easily occurs, for example, a splicing position between frame data, a position with a relatively large offset after processing in the flowchart of FIG. 2, and the like.

The following describes the method with reference to another embodiment of the present disclosure.

The solution of another embodiment of the present disclosure may be applied to a panoramic photographing scene including a ranging function device. The main purpose is to improve the panoramic photographing quality and improve the user experience. Another example of the present disclosure includes the following two parts.

The first part: the panoramic correction is performed by using the depth information. A graph card or a real view which has a known distance has been used in advance to obtain data of an object to be captured, a photographing distance and actual image point coordinates in an image plane, and ideal image point coordinates. The mapping relationship between the object to be picked and the ideal image point coordinates is determined by using data fitting, a least squares method, or the like, so as to establish actual pixel positions and corresponding offsets of the object under different distances. When a terminal takes a panoramic photograph, firstly, depth/distance information about a photographed object is obtained by using a distance measurement module of the terminal, and then image data is processed by using a known mapping relationship or obtaining an offset that needs to be corrected for a corresponding image point.

The second part: the image data to be corrected is processed by using the correlation of the images. Processing the image data, and performing interpolation processing on a place where an imaging point needs to be interpolated. The algorithm uses a correlation relationship between pixels around a pixel point to be processed to calculate a value of the pixel point to be processed, thereby solving the problem of insufficient processing details and smoothness of a conventional interpolation algorithm.

Figure 3:
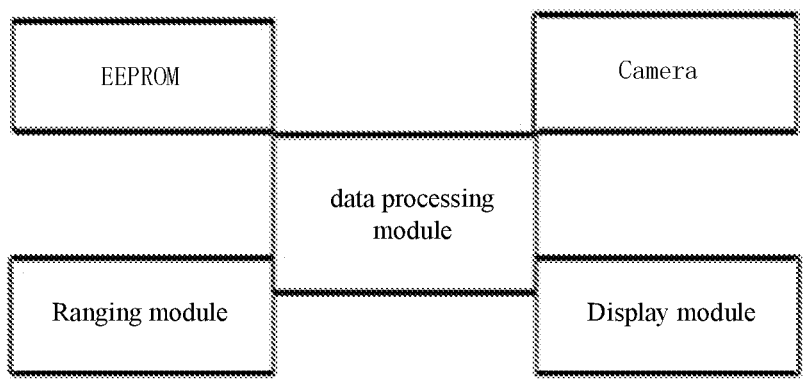
FIG. 3 is a structural diagram of a terminal according to another embodiment of the present disclosure.

FIG. 3 is a structural schematic diagram of a terminal according to another example of the present disclosure. As shown in FIG. 3, the terminal comprises a EEPROM, a Camera, a distance measuring module, a data processing module and a display module. A terminal device captures a scene by means of a camera device, acquires an image and processes image data. The data processing herein may be a data processing chip or may be processing implemented by software. Because the panoramic photograph is a result of stitching and synthesizing a frame of photograph, both the previous correction and the subsequent correction of the panoramic photograph may be decomposed into a single-frame photograph for processing.

Figure 4:
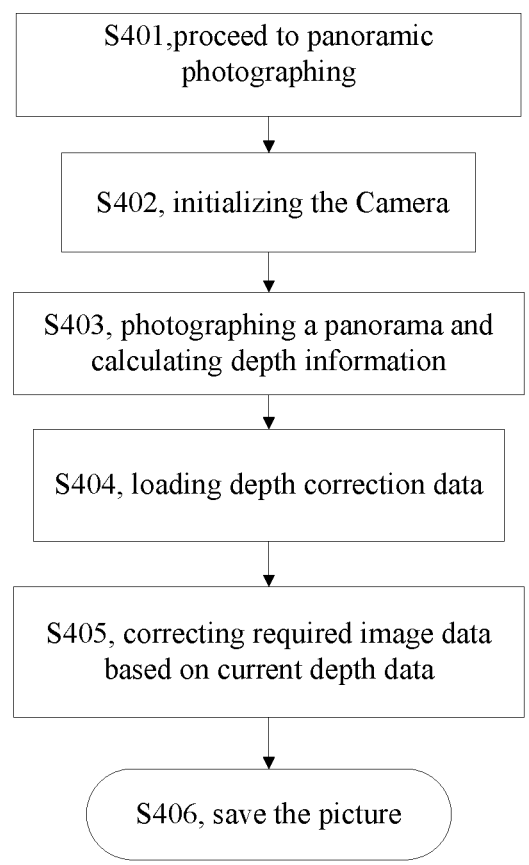
FIG. 4 is a flowchart of rectifying a panoramic photographic image according to another embodiment of the present disclosure.

FIG. 4 is a flowchart of correcting a panoramic photographic image according to another embodiment of the present disclosure. As shown in FIG. 4, the method comprises the following steps:

S401, entering a panoramic photographing;
S402, initializing imaging;
S403, photographing a panorama and calculating depth information;
S404, loading depth correction data;
S405, correcting the required image data according to the current depth data;
S406, saving the picture.

The following is a flowchart of processing a panoramic shot image, including the following steps:

Step one, correcting the lens distortion of the camera module.

First, a correction relation is determined by using a series of picture cards or real scenes containing position information, wherein the picture cards are not limited to objects to be photographed such as a checkerboard, concentric circles and dot matrix patterns. It is assumed that the pixel coordinate of the actual imaging is (x" y"), and the corrected pixel coordinate (x' y') is represented as follows, $$\begin{bmatrix} x' \\ y' \end{bmatrix} = f(x'', y'', k_1, k_2, k_3, p_1, p_2)$$

Where $k_1$, $k_2$, $k_3$ is the radial distortion correction parameter, $p_1$, $p_2$ is the tangential distortion correction parameter. Corresponding pixel data may be fitted to a corresponding functional relationship using a least squares method or the like.

Step two, determining a functional relationship between the object to be imaged and the ideal imaging point.

Taking the imaging plane as a reference plane, the distance of the photographed subject from this plane is expressed as follows:

$(Z_1, Z_2, \ldots, Z_n)$

Wherein n represents a picture card or a real scene at n groups of distances which need to be corrected, and the value of n can be appropriately adjusted according to lens parameters, calculation amounts, imaging effects, etc., when applied, the actual distance is not a value in the sequence and is interpolated from the neighboring distance values.

Figure 5:
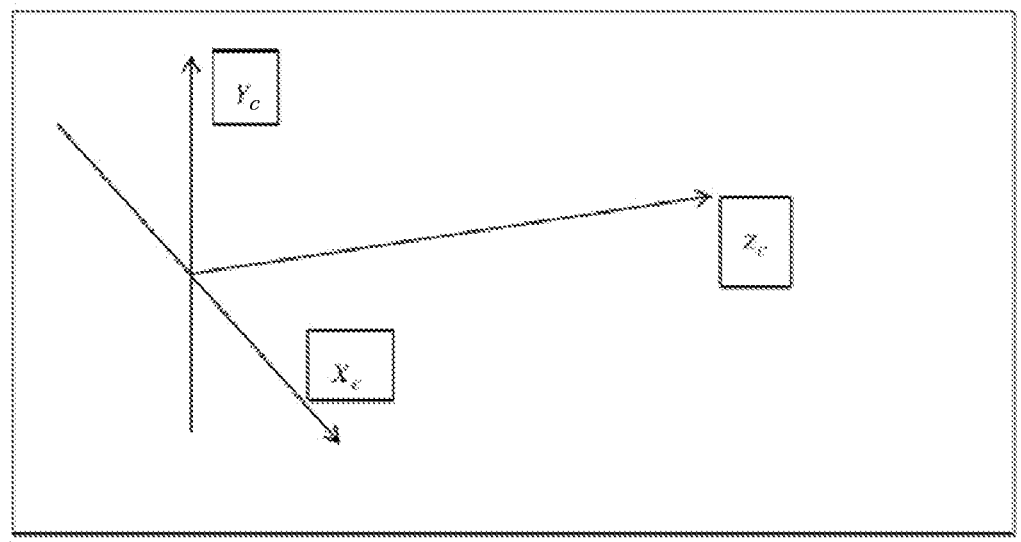
FIG. 5 is a schematic diagram of a coordinate system according to another embodiment of the present disclosure.
Figure 6:
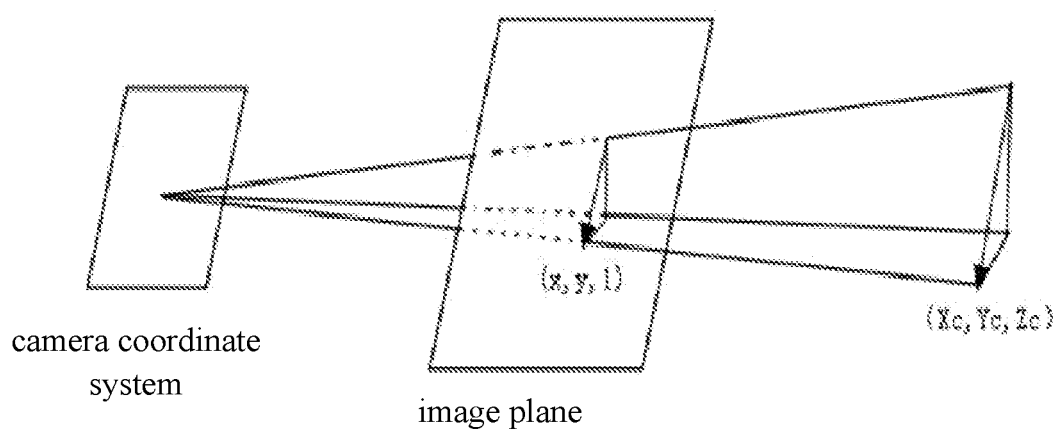
FIG. 6 is a schematic diagram of an imaging plane of a camera according to another embodiment of the present disclosure.

FIG. 5 is a schematic diagram of a coordinate system according to another example of the present disclosure. FIG. 6 is a schematic diagram of an imaging plane of a camera according to another example of the present disclosure. As shown in FIGS. 5 and 6, it is assumed that, at a distance Z, location information of a certain correction point of an object is represented by P coordinates in a world coordinate system: P(X,Y,Z), converting into a homogeneous coordinate system is expressed as: P(X, Y, Z,1), the transformation of the world coordinate system to the camera coordinate system is represented in matrix form as follows:

$$P_c(X_c, Y_c, Z_c, 1) = P(X, Y, Z, 1) M_w$$

$$M_W = \begin{bmatrix} a_{11} & a_{12} & a_{13} & a_{14} \\ b_{11} & b_{12} & b_{13} & b_{14} \\ c_{11} & c_{12} & c_{13} & c_{14} \\ d_{11} & d_{12} & d_{13} & d_{14} \end{bmatrix}$$

The coordinates $M_w$ may be translated, rotated, scaled, etc., and generally $a_{14}, b_{14}, c_{14}=0, d_{14}=1$. Other parameters may be obtained according to the least squares method of information corresponding to the correction points.

Because camera imaging is a process of projecting three-dimensional information onto a two-dimensional imaging plane, the process may be implemented by means of projection transformation, and may be expressed as follows:

$$P_p(X_p, Y_p, Z_p, 1) = P_c(X_c, Y_c, Z_c, 1) M_p$$

$$M_p = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix}$$

$M_P$ may determine parameters in the matrix according to the data of the correction point and the projection model, and the projection model adjusts according to the data of the panoramic correction point.

The unit of the coordinates of the camera plane coordinate system is m, but we read the pixel coordinates when using the image captured by the camera, so further coordinate conversion is needed as follows:

$$\begin{bmatrix} x'' \\ y'' \end{bmatrix} = (X_p \ Y_p \ Z_p \ 1) M_s$$

$M_s$ is also referred to as an inner reference matrix of the camera, in which, after the (x" y") transforms at a time, distance information is contained, and is represented as actual pixel coordinates at distance Z. The above matrix multiplication may be combined to obtain a comprehensive transformation matrix M, $$\begin{bmatrix} x'' \\ y'' \end{bmatrix} = (X \ Y \ Z \ 1) M$$

The corrected image pixel coordinates (x' y') may be obtained by passing (x" y") through the function of the first step of lens distortion correction, $$\begin{bmatrix} x' \\ y' \end{bmatrix} = f_{dis}(x'', y'', k_1, k_2, k_3, p_1, p_2)$$

The (x' y') further adjusts according to the actual imaging effect to obtain the final ideal pixel coordinates (x y).

Through the corrected object coordinates (X Y Z) and corresponding ideal pixel coordinates (x y) at different distances $(Z_1 \ldots Z_n)$, a series of integrated transformation matrices ($M_1 \ldots M_n$) at different distances can be obtained, and corresponding transformation matrices and distortion correction parameters are stored in the EEPROM, and invoked during panoramic photographing.

Step three, while taking a panoramic photograph, using a ranging module of a terminal to test depth information of an object to be photographed to obtain coordinates (X Y Z) loading data in an EEPROM, and calculating to obtain corrected coordinates (x y). If the actual distance is not within the previously identified distance sequence ($Z_1 \ldots Z_n$), it is determined firstly between which two sequences the current distance is located, then the correction parameters at these two distances are loaded, then the corresponding correction matrix is calculated by interpolation, and finally corresponding pixel coordinates are obtained.

In order to reduce the amount of calculation, simplified processing may be appropriately performed, relatively dense correction data is collected for a near object, and a relatively far object may be appropriately increased in collection intervals or a relatively far part is not corrected without affecting a subjective effect.

In order to reduce the computation time, ($Z_1 \ldots Z_n$), (X Y Z) and the corresponding corrected pixel coordinates at different distances can be directly stored into a table, and the subsequent correction is implemented by using a look-up table.

Step four, performing interpolation processing on the final imaging using the image correlation, on the one hand, since the nodes evenly or regularly distributed in the correction graph are used as the correction data for calculation, there is no processing on the pixel points distributed between the correction points, and thus interpolation processing is required. On the other hand, when lens distortion is large, interpolation needs to be performed.

Setting the Z distance, the actual imaging point p image coordinates (x, y), the corrected imaging point p' image coordinates (x+Δx, y+Δy), and when the corrected image coordinates (x+Δx, y+Δy) are non-integral, it is necessary to interpolate to obtain the pixel value of the corresponding integer position. When the offset position (Δx, Δy)>1, it is illustrated that the pixel points need to be supplemented between the actual image coordinates (x,y) and the corrected image coordinates (x+Δx, y+Δy) Unlike the conventional interpolation, the pixel value of the position to be processed is obtained by using the correlation between the pixel point to be supplemented and the surrounding pixels.

Assuming that the actual pixel p, the pixel to be solved is $p_i$, $p_j$ is a pixel value in an adjacent threshold of the actual pixel p, and an adjacent threshold v=k1*max(Δx, Δy), k1≥1 is defined $$p_i(x, y) = \sum_{j \in v} w(i, j) p_j$$

w(i, j) is $p_i$ and $p_j$ correlation weights:

$$w(i, j) = k_2 e^{-\frac{Dis(i,j)}{k3}}$$

Wherein, Dis(i,j) is an Euclidean distance between $p_i$ and $p_j$, and $k_2$, $k_3$ is an adjustable parameter.

$$Dis(i,j) = \|p_i - p_j\|$$

Step five, after the correction is completed, the corrected panoramic image is stored.

Another embodiment of the present disclosure realizes that it belongs to a built-in system algorithm. There is no independent user interface. The method is mainly implemented based on camera on a terminal. In case of using the described function, the camera disclosure interface may prompt "in panoramic photographing".

By means of the solution, when a terminal performs panoramic photographing, the distortion caused by the distortion of an excessively large photographing field angle of the latter can be improved, thereby improving the panoramic photographing effect and improving the user experience.

The foregoing solution may be used for image quality improvement of panoramic photographing, and may also be used for 360° scene video monitoring.

Through the description of the foregoing embodiments, a person skilled in the art may clearly understand that the method according to the foregoing embodiments may be implemented by software in addition to a necessary universal hardware platform, and definitely may also be implemented by hardware. However, in many cases, the former is a preferred implementation. Based on such understanding, the technical solutions of the present disclosure can be embodied in the form of a software product essentially or in part contributing to the prior art. The computer software product is stored in a storage medium (such as a ROM/RAM, a magnetic disk, and an optical disk), and includes several instructions for enabling a terminal device (which may be a mobile phone, a computer, a server, or a network device) to execute the method described in each embodiment of the present disclosure.

Embodiment Two

The present embodiment further provides a panoramic photographing device. The device is configured to implement the foregoing embodiments and exemplary implementation modes, and what has been described will not be elaborated. The term "module", as used hereinafter, is a combination of software and/or hardware capable of realizing a predetermined function. Although the device described in the following embodiment is preferably implemented by software, implementation of hardware or a combination of software and hardware is also possible and conceived.

According to another embodiment of the present disclosure, a panoramic photographing device is provided, which includes:

a first acquisition module, which is configured to acquire depth information about a photographed object in panoramic photographing;

a second acquisition module, which is configured to acquire, according to a preset mapping relationship between depths and offsets, an offset corresponding to the photographed object in the panoramic image;

a first correction module, which is configured to correct the panoramic image of the photographed object according to the offset.

During panoramic photographing, firstly, depth information about a photographed object, i.e. a distance between the photographed object and a photographing device, is acquired by means of a distance measurement device; then, an offset corresponding to a current distance is acquired by querying a pre-set mapping relationship; and subsequently, original imaging of the photographed object is correspondingly offset in a panoramic image, so as to form a corrected panoramic image. By means of the solution, the problem in the related art that an object in a panoramic photographing image is distorted greatly is solved, the distortion of the object in the panoramic image is precisely and efficiently corrected, and the aesthetic feeling of panoramic imaging is guaranteed.

In an embodiment, the device further comprises an establishing module configured to establish, before the second acquisition module acquires, according to a preset mapping relationship between depths and offsets, an offset corresponding to the photographed object in the panoramic image.

The establishing module further includes:

a first determining unit, which is configured to perform panoramic photographing on a known scene, and determine an ideal position of an object with different depths in a photographing image according to a position relationship between different objects in the known scene;

a second determination unit, which is configured to determine an offset of each object according to a difference between an ideal position and an actual position of each object in a photographed picture;

an establishing unit, which is configured to establish the mapping relationship according to the offset of each object and the depth information of each object.

In an embodiment, the first determination unit is further configured to obtain a distance proportion between different objects in the known scene; and acquiring an ideal position of each object in the photographed picture according to the distance proportion.

In an embodiment, before correcting the panoramic image of the photographed object according to the offset, the first correction module is further configured to acquire distortion correction parameters of a lens of a photographing module of the camera; and to correct the panoramic image according to the distortion correction parameter.

In an embodiment, the first correction module is configured to acquire an original imaging position of the photographed object in the panoramic image; and move the original imaging position according to the offset.

In an embodiment, after correcting the panoramic image of the photographed object according to the offset, the first correction module is further configured to acquire a corrected image as a first image, and detect a region to be interpolated in the first image according to a pre-set rule, and is configured to perform interpolation processing on the region to be interpolated according to pixels in a pre-set range around the region to be interpolated.

In an embodiment, the first correction module is further configured to detect a joining position between the frame data in the first image, and use the joining position as the region to be interpolated, and/or, is further configured to detect pixel points in the first image whose offsets have been shifted are greater than a threshold, and use the pixel points as the region to be interpolated.

It should be noted that each module may be implemented by software or hardware. The latter may be implemented in the following manner, but is not limited thereto. All the modules are located in a same processor; alternatively, the modules are located in different processors in an arbitrary combination.

Embodiment Three

According to another embodiment of the present disclosure, a camera is provided, including:

a ranging device, configured to acquire depth information about a photographed object in panoramic photographing;

a processor, configured to acquire, according to a pre-set mapping relationship between a depth and an offset, an offset corresponding to the photographed object in the panoramic image; and set to correct the panoramic image of the subject according to the offset.

According to another embodiment of the present disclosure, a mobile terminal is also provided, and the mobile terminal includes:

a ranging device, configured to acquire depth information about a photographed object in panoramic photographing;

a processor, configured to acquire, according to a pre-set mapping relationship between a depth and an offset, an offset corresponding to the photographed object in the panoramic image; and set to correct the panoramic image of the subject according to the offset.

The camera and the mobile terminal in Embodiment three may be devices that execute the process in FIG. 2.

Embodiment Four

An embodiment of the present disclosure further provides a storage medium. In an embodiment, in this embodiment, the storage medium may be configured to store program codes for executing the following steps:

S1, acquiring depth information about a photographed object in panoramic photographing;

S2, acquiring, according to a pre-set mapping relationship between a depth and an offset, an offset corresponding to the photographed object in the panoramic image;

S3, correcting the panoramic image of the photographed object according to the offset.

In an embodiment, in this embodiment, the storage medium may include, but is not limited to, any medium that can store program codes, such as a USB flash disk, a Read-Only Memory (ROM), a Random Access Memory (RAM), a removable hard disk, a magnetic disk, or an optical disk.

An embodiment of the present disclosure also provides an electronic device, comprising a memory and a processor, wherein the memory stores a computer program, and the processor is configured to run the computer program so as to execute the steps in any one of the method embodiments.

In an embodiment, the electronic device can further comprise a transmission device and an input/output device, wherein the transmission device is connected to the processor, and the input/output device is connected to the processor.

In an embodiment, in this embodiment, the processor may be arranged to execute the following steps by means of a computer program:

S1, acquiring depth information about a photographed object in panoramic photographing;

S2, acquiring, according to a pre-set mapping relationship between a depth and an offset, an offset corresponding to the photographed object in the panoramic image;

S3, correcting the panoramic image of the photographed object according to the offset.

In an embodiment, for specific examples in this embodiment, reference may be made to the examples described in the foregoing embodiments and optional implementations, and details are not repeatedly described herein in this embodiment.

In an embodiment, for specific examples in this embodiment, reference may be made to the examples described in the foregoing embodiments and optional implementations, and details are not repeatedly described herein in this embodiment.

Obviously, a person skilled in the art should understand that each module or each step of the present disclosure can be implemented by a universal computing device, and they can be concentrated on a single computing device or distributed on a network composed of a plurality of computing devices. In an embodiment, they may be implemented by program codes executable by a computing device, so that they may be stored in a storage device and executed by the computing device, and in some cases, the illustrated or described steps may be executed in an order different from that here. Alternatively, they are manufactured into integrated circuit modules respectively, or a plurality of modules or steps in them are manufactured into a single integrated circuit module for implementation. Thus, the present disclosure is not limited to any particular combination of hardware and software.

The foregoing descriptions are merely exemplary embodiments of the present disclosure, but are not intended to limit the present disclosure. For those skilled in the art, the present disclosure may have various modifications and variations. Any modifications, equivalent replacements, improvements and the like made within the spirit and principle of the present disclosure shall belong to the scope of protection of the present disclosure.

What is claimed is:

1. A panoramic photographing method, comprising:
   acquiring depth information about a photographed object in panoramic photographing;
   acquiring, according to a pre-set mapping relationship between a depth and an offset, an offset corresponding to the photographed object in the panoramic image;
   correcting the panoramic image of the photographed object according to the offset;
   wherein before acquiring, according to the preset mapping relationship between a depth and an offset, the offset corresponding to the photographed object in the panoramic image, the mapping relationship is established in the following manner:
   performing panoramic photographing on a known scene, and determining, according to a positional relationship between different objects in the known scene, ideal positions of objects with different depths in a photographed picture;
   determining an offset of each object according to a difference between an ideal position and an actual position of each object in the photographed picture;
   establishing the mapping relationship according to offsets of each of the objects and depth information of each of the objects.

2. The method according to claim 1, wherein determining, according to the position relationship between different objects in the known scene, ideal positions of objects with different depths in the photographed picture comprise:
   obtaining a distance proportion between different objects in the known scene;
   acquiring an ideal position of each object in a photographed picture according to the distance proportion.

3. The method according to claim 1, wherein before correcting the panoramic image of the photographed object according to the offset, the method further comprises:
   acquiring distortion correction parameter of lens of a camera compact module of a camera;
   correcting the panoramic image according to the distortion correction parameter.

4. The method according to claim 1, wherein correcting the panoramic image of the photographed object according to the offset comprises:
   acquiring an original imaging position of the photographed object in the panoramic image;
   moving an original imaging position according to the offset.

5. The method according to claim 1, wherein after correcting the panoramic image of the photographed object according to the offset, the method further comprises:
   acquiring a corrected image as a first image, and detecting a region to be interpolated in the first image according to a pre-set rule;
   performing interpolation processing on the to-be-interpolated zone according to pixels in a preset range around the to-be-interpolated zone.

6. The method according to claim 5, wherein detecting a region to be interpolated in the first image according to a pre-set rule comprises at least one of the following:
   detecting a joining position between frame data in the first image, and using the joining position as the region to be interpolated;
   detecting pixel points in the first image whose offsets have been shifted are greater than a threshold, and using the pixel points as the region to be interpolated.

7. A non-transitory storage medium, wherein a computer program is stored in the storage medium, and the computer program, when running, is configured to execute the method as claimed in claim 1.

8. An electronic device, comprising a memory and a processor,
   wherein a computer program is stored in the memory, and the processor is configured to run the computer program so as to execute the method as claimed in claim 1.

9. An electronic device, comprising a memory and a processor,
   wherein a computer program is stored in the memory, and the processor is configured to run the computer program so as to execute the method as claimed in claim 2.

10. An electronic device, comprising a memory and a processor,
    wherein a computer program is stored in the memory, and the processor is configured to run the computer program so as to execute the method as claimed in claim 3.

11. A panoramic photographing device, comprising a hardware processor configured to:
    acquire depth information about a photographed object in panoramic photographing;
    acquire, according to a preset mapping relationship between a depth and an offset, an offset corresponding to the photographed object in the panoramic image;
    correct the panoramic image of the photographed object according to the offset;
    the hardware processor is further configured to establish, before acquires, according to a pre-set mapping relationship between a depth and an offset, an offset corresponding to the photographed object in the panoramic image;
    wherein the hardware processor is further configured to:
    perform panoramic photographing on a known scene, and determine, according to a positional relationship between different objects in the known scene, ideal positions of objects with different depths in a photographed picture;
    determine an offset of each object according to a difference between an ideal position and an actual position of each object in a photographed picture; and establish the mapping relationship according to the offset of each object and the depth information of each object.

12. The device according to claim 11, wherein,
the hardware processor is further configured to obtain a distance proportion between different objects in the known scene; and acquiring an ideal position of each object in the photographed picture according to the distance proportion.

13. The device according to claim 11, wherein,
before correcting the panoramic image of the photographed object according to the offset, the hardware processor is further configured to acquire distortion correction parameters of lens of a camera compact module of a camera; and to correct the panoramic image according to the distortion correction parameter.

14. The device according to claim 11, wherein,
the hardware processor is configured to acquire an original imaging position of the photographed object in the panoramic image; and move the original imaging position according to the offset.

15. The device according to claim 11, wherein,
after correcting the panoramic image of the photographed object according to the offset, the hardware processor is further configured to acquire a corrected image as a first image, and detect a region to be interpolated in the first image according to a pre-set rule, and perform interpolation processing on the region to be interpolated according to pixels in a pre-set range around the region to be interpolated.

16. The device according to claim 15, wherein the hardware processor is further configured to detect a joining position between the frame data in the first image, and use the joining position as the region to be interpolated;

and/or, is further configured to detect pixel points in the first image whose offsets have been shifted are greater than a threshold, and use the pixel points as the region to be interpolated.

17. A camera, comprising:
a ranging device, configured to acquire depth information about a photographed object in panoramic photographing;

a processor, configured to acquire, according to a pre-set mapping relationship between a depth and an offset, an offset corresponding to the photographed object in the panoramic image;

and correct the panoramic image of the photographed object according to the offset;

wherein the processor is further configured to:

perform panoramic photographing on a known scene, and determine, according to a positional relationship between different objects in the known scene, ideal positions of objects with different depths in a photographed picture;

determine an offset of each object according to a difference between an ideal position and an actual position of each object in a photographed picture; and establish the mapping relationship according to the offset of each object and the depth information of each object.

* * * * *